United States Patent [19]

Bewsky

[11] Patent Number: 5,579,806
[45] Date of Patent: Dec. 3, 1996

[54] HIGH SPEED SELF SWITCHING VALVE FOR PRODUCING FROM A CONSTANT PRESSURE FLUID SOURCE A SERIES OF REPETITIVE AND VARIABLE FLUID PULSES

[75] Inventor: John C. Bewsky, Winnipeg, Canada

[73] Assignee: Vansco Electronics Ltd., Winnipeg, Canada

[21] Appl. No.: 519,895

[22] Filed: Aug. 28, 1995

[51] Int. Cl.⁶ ................................................. F16K 31/122
[52] U.S. Cl. ...................... 137/624.14; 251/324
[58] Field of Search .................. 137/624.14, 624.15, 137/883; 251/324

[56] References Cited

U.S. PATENT DOCUMENTS

| | | | |
|---|---|---|---|
| 3,053,461 | 9/1962 | Inglis | 137/624.14 X |
| 4,267,856 | 5/1981 | Kwok et al. | |
| 4,465,090 | 8/1984 | Morgan et al. | 137/624.14 X |
| 5,000,516 | 3/1991 | Kolle et al. | |
| 5,025,962 | 6/1991 | Renfro | 137/624.14 X |

FOREIGN PATENT DOCUMENTS 420811 8/1974 U.S.S.R. .

OTHER PUBLICATIONS

Article by Kwok et al "A Liquid Operated Oscillator" (1 page).
Paper by Voisekhovskii et al "The Use of Pulsed Two–Dimensional High–Speed Liquid Jets for Breaking up Exhausted Assemblies of Fuel Elements of Atomic Power Stations" (1 page).

Primary Examiner—Kevin Lee
Attorney, Agent, or Firm—Adrian D. Battison; Murray E. Thrift

[57] ABSTRACT

A valve for producing from a constant pressure fluid source a series of repetitive fluid pulses, comprises a valve body having an inlet chamber, an outlet chamber and a control chamber, each defined in the valve body. An inlet duct connects the inlet chamber to a source of fluid at a substantially constant pressure. A valve seat is positioned between the inlet chamber and the outlet chamber and a valve member is movable along an axis of the valve body in opposed axial directions between a first closed position wherein the valve member rests on the valve seat and a second open position in which the valve member separates from the valve seat allowing fluid flow from the inlet chamber to the outlet chamber. The valve member has a piston movable therewith mounted in the control chamber for sliding movement, the piston having a piston face presented to pressure of fluid in the control chamber such that changes in the pressure of the fluid in the control chamber tend to move the piston and the valve member between the first closed position and the second open position. Fluid control is provided by a first control channel bleeding fluid from the inlet chamber to the control chamber at a first controlled rate and a second control channel bleeding fluid from the control chamber to a discharge vent at a second controlled rate different from the first controlled rate. A valve element in the fluid control channel operated by movement of the valve member for opening and closing the flow of fluid through the fluid control channel increases and decreases the fluid pressure in The control chamber so as to cause movement of the valve member.

18 Claims, 1 Drawing Sheet

CLOSED

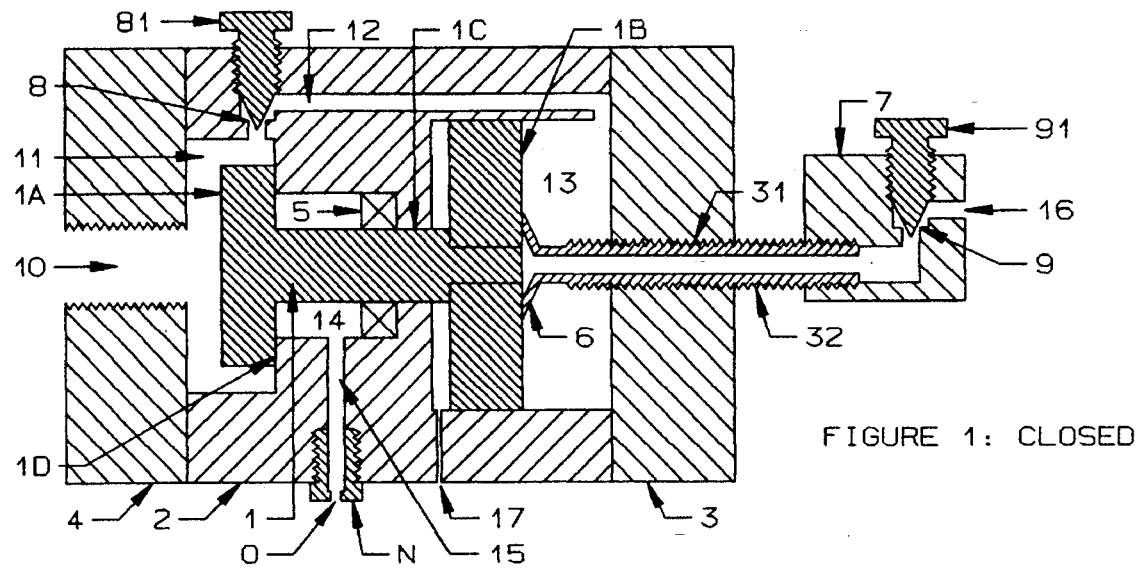
FIGURE 1: CLOSED
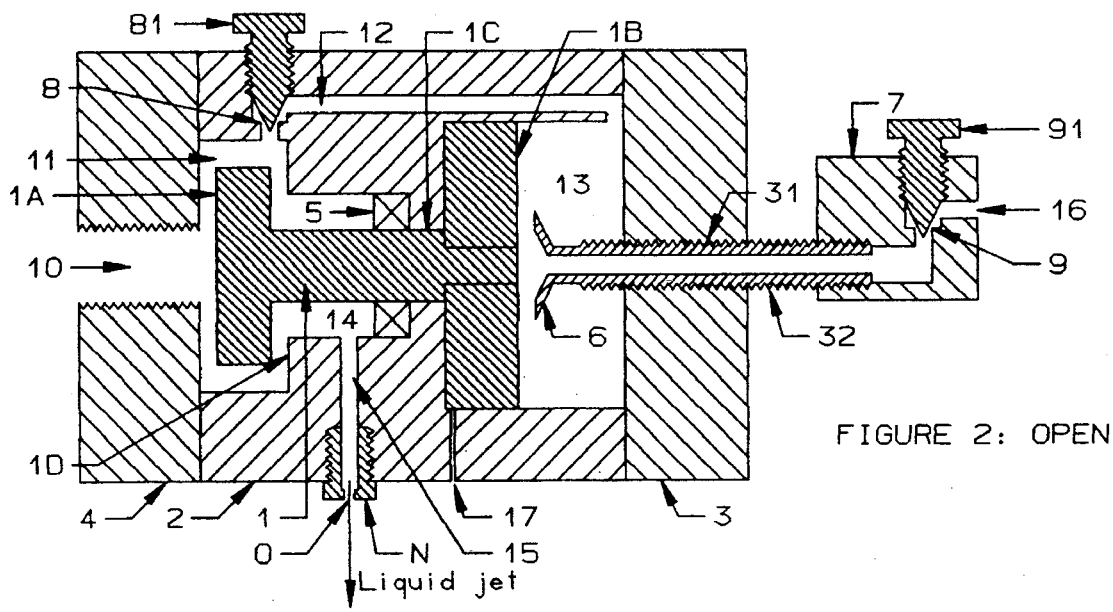
FIGURE 2: OPEN

HIGH SPEED SELF SWITCHING VALVE FOR PRODUCING FROM A CONSTANT PRESSURE FLUID SOURCE A SERIES OF REPETITIVE AND VARIABLE FLUID PULSES

BACKGROUND OF THE INVENTION

This invention relates to a self-switching valve for producing from a constant pressure fluid source a series of repetitive fluid pulses, which valve is self switching that is it does not require any outside power source other than the pressure supply to effect the switching action, the valve preferably providing a high speed and variable switching action.

One example of a technology which requires a valve of this type is that relating to the injection of liquid such as fertilizer into the ground from a fluid injection nozzle mounted above the ground. This intermittent action of high speed liquid jets into the ground has been shown to increase plant quality and productivity. For this purpose it is desirable that a valve be provided which transforms a constant 28 MPa pressure supply into a pulsating output of the same pressure but of variable pulse duration and frequency.

Currently the technology used in this field includes electrically actuated solenoid valves. Solenoid valves offer a variable open time and frequency simply by changing the nature of the input signals. Adjustment of these two parameters gives the operator (or an automatic timing control system) the flexibility to change both the injection quantity and spacing on-the-fly to match the injection equipment operation with the ground requirements and a changing ground speed. However solenoid valves generally leak and switch too slowly contributing to an ineffective and short system life. Another possibility includes valves which are ground driven, but these do not provide an adjustable open time and operating frequency which is independent of ground speed.

There is a demand therefore for an improved valve for this particular function, but the present invention is not limited to this particular function and the valve of the present invention may be used in other applications that require either a pulsating high pressure or force such as the descaling of pipes, a pressure actuated jack hammer or vibration excitation.

A search of valves effecting this particular function has revealed a number of prior art arrangements as follows:

SU Patent 420811 (Konoplev) discloses a poppet type valve, designed to work with gas, which is spring biased in one direction (closed) and displaced (opened) in the opposed direction by fluid pressure generated by flow from an inlet to a control chamber. However the fluid flow is controlled by a solenoid so that the valve requires an external power source in addition to that of the fluid inlet pressure supply. In addition the valve is relatively complicated with several moving parts thus increasing cost and reliability problems.

U.S. Pat. No. 5,000,516 (Kolle) discloses a valve for generating high pressure pulses for demolishing rock and the like. This arrangement includes an accumulator into which fluid is pumped from a high pressure source through an inlet chamber. When the source is closed off and the inlet vented to atmosphere, the pressurized fluid in the accumulator rapidly opens a popper valve and fluid discharges at high pressure through an outlet. It is therefore necessary to provide an outside source of power to operate the valving arrangement which closes off the inlet source and opens the connection to atmosphere.

U.S. Pat. No. 4,267,856 (Kwok) discloses a fluid oscillator which generates a pulsating flow by using a ball which alternately blocks the mouth of one of two output ducts which are in a conical pressure chamber.

An article by Kwok in the Instrument Society of America Conference dated Oct. 15th to 18th 1973 paper No. 73-830 discloses a liquid operated oscillator which uses the inertia in a fluid column to effect opening and closing of a diaphragm type valve to generate the pulsation in the output. Neither of the above oscillators by Kwok is suitable for producing the ground injection pulses with which the present invention is concerned nor provides any technique for varying the pulse frequency or duration which is highly desirable for such pulses.

Voisekhovskii et al in a paper entitled "The use of pulsed two-dimensional high-speed liquid jets for breaking up exhausted assemblies of fuel elements of atomic power stations" translated from Atomnaya Energiya, Vol. 68, No. 6, pp. 443–445, June 1990 discloses briefly an arrangement for the generation of pulsed water fountains which is believed to have been used in a research project.

SUMMARY OF THE INVENTION

It is one object of the present invention to provide an improved valve which is self switching for generating from a constant pressure fluid source a series of repetitive fluid pulses which is simple in construction with limited moving parts thus providing a high level of reliability, and which is preferably of a high speed and variable switching action.

According to one aspect of the invention there is provided a valve for producing from a constant pressure fluid source a series of repetitive fluid pulses, comprising: a valve body; an inlet chamber, an outlet chamber and a control chamber, each defined in the valve body; an inlet duct for connecting the inlet chamber to a source of fluid at a substantially constant pressure; an outlet duct for communicating fluid pulses from the outlet chamber; a valve seat positioned between the inlet chamber and the outlet chamber; a valve member movable along an axis of the valve body in opposed axial directions between a first closed position wherein the valve member rests on the valve seat and a second open position wherein the valve separates from the valve seat allowing flow from the inlet chamber to the outlet chamber; the valve member having a piston thereon movable therewith mounted in the control chamber for sliding movement therealong, the piston having a piston face presented to pressure of fluid in the control chamber such that changes in the pressure of the fluid in the control chamber tend to move the piston and the valve member between said first closed position and said second open position; a fluid control channel including a first control channel portion bleeding fluid from the inlet chamber to the control chamber at a first controlled rate and a second control channel portion bleeding fluid from the control chamber to a discharge vent at a second controlled rate different from the first controlled rate; and a valve element in the fluid control channel operated by movement of said valve member for opening and closing the flow path of fluid through the fluid control channel whereby to increase and decrease pressure in the control chamber for effecting movement of the valve member.

The invention therefore operates by controlling the differential flow into and out of the control pressure chamber while operating a valve element which opens and closes the differential flow by the movement of the valve member itself. This technique therefore uses a fraction of the available energy in the pressurized working fluid (generally liquid) by utilizing the finite compressibility of the fluid in the control chamber.

One embodiment of the invention will now be described in conjunction with the accompanying drawings in which:

BRIEF DESCRIPTION OF THE DRAWINGS,

FIG. 1 is a longitudinal cross sectional view through a valve according to the present invention in a first closed position during which no output pulse is generated.

FIG. 2 is the same cross section as that of FIG. 1 showing the valve in an open position during which the pulse is generated.

In the drawings like characters of reference indicate corresponding parts in the different figures.

DETAILED DESCRIPTION

The valve of the present invention comprises a valve body 2 which is generally cylindrical, but not necessarily of circular cross-section, having a longitudinal axis along the valve body. At one end of the valve body 2 is provided a cylindrical inlet chamber 11 which is closed by an end cap 4 with an inlet duct 10 through the end cap through which the high pressure supply enters communicating with the inlet chamber 11. At the opposite end of the valve body 2 is provided a cylindrical control chamber 13 which is again closed by a second end cap 3 attached to the valve body. The end cap 3 has a threaded bore 31 containing a threaded control tube 32 which extends from the control chamber 13 to a vent 16 to atmosphere via a needle valve 9 in a needle valve block 7. The needle valve 9 is thus adjustable by a thumb screw 91 to effect a control of the rate of fluid passing through the tube 32 to the vent 16.

The valve block further includes a cylindrical outlet chamber 14 which is coaxial with and directly connected to the inlet chamber 11. Between the outlet chamber 14 and the inlet chamber 11 is provided an annular seat 1D defined at a shoulder between the inlet chamber 11 and the outlet chamber 14, the latter being of smaller diameter. The outlet chamber 14 is connected to a duct 15 which provides an outlet of the valve.

The inlet chamber 11 is connected via a control channel 12 to the control chamber 13. The control channel 12 extends radially outwardly from the inlet chamber 11 to a needle valve 8 which acts to control by a thumb screw 81 the rate of flow through the channel 12. At the needle valve 8, the channel 12 extends axially of the valve body at a position outside the chamber 13 and terminates in a radially inwardly extending connection to the chamber 13 at the end cap 3. The control chamber 13 has a diameter, as shown, greater than that of the inlet chamber 11 and thus greater than the outlet chamber 14.

Within the chambers 11, 13 and 14 is mounted a valve member 1 in the form of a popper valve assembly having a popper or valve head 1A in the form of a circular disc sitting in the inlet chamber 11 with one axial face of the poppet engageable with the seat 1D in a valving action. The valve member further includes a control piston 1B slidable within the control chamber 13 and having a diameter which is a sliding fit on the inside surface of the chamber 13. Between the piston 1B and the valve head 1A is provided a valve stem 1C which extends axially of the valve body and passes through the outlet chamber 14 and through a seal 5 at the end of the outlet chamber to the control chamber 13. The stem 1C is thus on the seat side of the valve head 1A and passes through the annular valve defined by the annular seat 1D surrounding the inlet 11 to the outlet chamber 14. An air space defined on the side of the piston 1B opposite to control chamber 13 is vented to atmosphere via a pressure equalization hole 17. On the end of the tube 32 is provided a flexible conical valve or mouth 6 which engages the flat end face of the piston 1B in a valving action so that pressure of the end face against the mouth 6 prevents the flow of fluid from the control chamber 13 through the tube 32.

In operation, in the position shown in FIG. 1, the valve head 1A is held against the seat 1D by the pressure of the fluid in the inlet chamber 11 and thus prevents the flow of fluid from the inlet 10 to the outlet 15. The inlet 10 is connected to a constant pressure source so that the inlet chamber 11 is maintained at the constant pressure. Liquid in the inlet chamber 11 thus flows through the channel portion 12 through the needle valve 8 at a rate controlled by the needle valve 8 to the chamber 13. In the closed position the piston 1B closes the mouth 6 so that the chamber 13 gradually increases in pressure until the pressure in chamber 13 creates a force on piston 1B that meets the force acting on the valve head 1A due to the pressure in the inlet chamber 11. At this time in view of the larger diameter and hence larger surface area of the piston 1B relative to the valve head 1A, the piston and the valve member move to the left thus forcing the valve head to leave the seat 1D and allow liquid to pass from the inlet chamber 11 around the valve into the outlet chamber 14. Once the liquid enters the outlet chamber and engages the rear face of the valve head, the valve member is "popped" open by moving rapidly to the left so that the pressure in the inlet chamber is directly communicated to the outlet chamber 14 and thus to the outlet 15 to generate a fluid or liquid pulse. The valve member thus moves to the position shown in FIG. 2. In this position the liquid pressure from the pressure supply 10 is communicated to the outlet 15 in a liquid jet. Also the liquid in the chamber 13 now passes to the vent 16 in view of the fact that the movement of the piston has opened the mouth 6. The needle valve 9 is adjusted relative to the needle valve 8 so that the rate of flow through the tube 32 is greater than the rate of flow through the channel 12 so that the liquid pressure in the chamber 13 gradually decreases due to the flow to the vent 16. As soon as the pressure in chamber 13 falls below a value that permits the force on valve head 1A due to the pressure in the inlet chamber 11 to overcome the combined forces acting on both the piston 1B and seat side of the poppet head 1A due to their respective chamber pressures, the valve member is moved to the right. This therefore moves the valve member back to the position shown in FIG. 1 in which the outlet chamber 14 is closed off from the inlet 11 and no liquid flows to the outlet 15. Hence the liquid pulse stops.

The valve therefore incorporates a poppet valve (a member of the seating class) that opens and closes by utilizing a small fraction of the energy contained in the pressurized operating fluid. By controlling the fluid pressure exerted on the control piston 1B that is attached rigidly to the free end of the poppet stem 1C, the position or state of the poppet valve can be controlled and maintained. This switching pressure varies between an upper limit which pushes open the poppet valve, and a lower limit which permits closure.

By controlling the fluid flow rate entering the control chamber, by means of the first needle valves, the switching pressure rise time and hence the duration of the closed state is controlled. By controlling the flow rate of fluid being released from the control chamber by the second needle valve, the pressure fall time and hence the duration of the open time is controlled.

The valve therefore develops a pulsating pressure output from a constant pressure supply and feeds the pulsation's to the outlet which can be provided with a nozzle N having a small orifice O used for injecting the liquid into the ground. By injecting aqueous solutions that nourish or protect plants, the ground is moistened and loosened and plant quality and productivity is increased.

The ability to adjust the duration of the open and closed time periods via the needle valves allows the operator to change both the injection quantity and spacing as the nozzle is moved over the ground on a suitable transport system.

The valve operates by itself so that no external actuation (power source) is required other than the pressure supply. Valve timing can be automated with a low power closed loop control system which includes a small outlet pressure switch to sense the state of the valve, two rotary or linear actuators to turn the thumb screws, and a simple electronic controller to set the valve timing to the desired setting. With the timing control system manually operated or automated with a battery supply, the valve can be used in remote areas or for other potential applications which require pulsating output pressure.

The valve is audibly quiet, robust, insensitive to hammer blows and simple in construction with only a single moving part.

In one embodiment, the valve transforms a constant 28 MPa pressure supply into a pulsating output of variable pulse duration and frequency. The example has a 35 mm diameter poppet valve and stroke of 0.127 mm. This valve opens in 0.8 ms and closes in 1.3 ms.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A valve for producing from a constant pressure fluid source a series of repetitive fluid pulses, comprising:

a valve body;

an inlet chamber, an outlet chamber and a control chamber, each defined in the valve body;

an inlet duct for connecting the inlet chamber to a source of fluid at a substantially constant pressure;

an outlet duct for communicating fluid pulses from the outlet chamber;

a valve seat positioned between the inlet chamber and the outlet chamber;

a valve member movable along an axis of the valve body in opposed axial directions between a first closed position wherein the valve member rests on the valve seat and a second open position in which the valve member separates from the valve seat allowing fluid flow from the inlet chamber to the outlet chamber;

the valve member having a piston thereon movable therewith mounted in the control chamber for sliding movement therealong, the piston having a piston face presented to pressure of fluid in the control chamber such that changes in the pressure of the fluid in the control chamber tend to move the piston and the valve member between said first closed position and said second open position;

a fluid control channel including a first control channel portion bleeding fluid from the inlet chamber to the control chamber at a first controlled rate and a second control channel portion bleeding fluid from the control chamber to a discharge vent at a second controlled rate different from the first controlled rate;

and a valve element in the fluid control channel operated by movement of said valve member for opening and closing the flow of fluid through the fluid control channel whereby to increase and decrease the fluid pressure in the control chamber for effecting movement of the valve member.

2. The valve according to claim 1 wherein the valve seat is annular and the valve member includes a circular valve head engageable onto the valve seat.

3. The valve according to claim 2 wherein the valve head is mounted within the inlet chamber with one end face of the valve head engageable against the valve seat.

4. The valve according to claim 1 including at least one variable flow member in the fluid control channel operable to vary the rate of flow of fluid through the fluid control channel to vary the frequency of movement of the valve member.

5. The valve according to claim 4 including a first variable flow member in the first control channel portion and a second variable flow member in the second control channel portion.

6. The valve according to claim 1 wherein the valve element comprises a mouth and a seat provided on a surface of the piston so that movement of the piston engages the mouth on the seat to effect opening and closing the valve element.

7. The valve according to claim 6 wherein the mouth is flexible and the seat is formed by a rigid surface portion of the piston.

8. The valve according to claim 6 wherein the mouth is defined at the end of a duct forming a portion of the fluid control channel.

9. The valve according to claim 3 wherein the piston has a surface area of the piston face which is greater than a surface area of the valve head such that a force due to the pressure within the control chamber applied against the piston face overcomes a force due to the pressure in the inlet chamber applied against the valve head in order for the valve head to separate from the valve seat.

10. The valve according to claim 9 wherein the second controlled rate is greater than the first controlled rate and wherein the valve element is located in the second control channel portion.

11. A valve for producing from a constant pressure fluid source a series of repetitive fluid pulses, comprising:

a valve body;

an inlet chamber, an outlet chamber and a control chamber, each defined in the valve body;

an inlet duct for connecting the inlet chamber to a source of fluid at a substantially constant pressure;

an outlet duct for communicating fluid pulses from the outlet chamber;

a valve seat positioned between the inlet chamber and the outlet chamber;

a valve member movable along an axis of the valve body in opposed axial directions between a first closed position wherein the valve member rests on the valve seat and a second open position in which the valve member separates from the valve seat allowing flow from the inlet chamber to the outlet chamber;

the valve member having a piston thereon movable therewith mounted in the control chamber for sliding movement therealong, the piston having a piston face presented to pressure of fluid in the control chamber such that changes in the pressure of the fluid in the control chamber tend to move the piston and the valve member between said first closed position and said second open position;

a fluid control channel including a first control channel portion bleeding fluid from the inlet chamber to the control chamber at a first controlled rate and a second control channel portion bleeding fluid from the control chamber to a discharge vent at a second controlled rate greater than the first controlled rate;

and a valve element in the second control channel portion operated by movement of said valve member for opening and closing the flow path of fluid from the control chamber to the vent whereby to increase and decrease the fluid pressure in the control chamber for effecting movement of the valve member.

12. The valve according to claim 11 wherein the first control channel is always open.

13. The valve according to claim 11 wherein the valve seat is annular and the valve member includes a circular valve head engageable onto the valve seat and wherein the valve head is mounted within the inlet chamber with one end face of the valve head engageable against the valve seat.

14. The valve according to claim 11 including at least one variable flow member in the fluid control channel operable to vary the rate of flow of fluid through the fluid control channel to vary the frequency of movement of the valve member.

15. The valve according to claim 14 including a first variable flow member in the first control channel portion and a second variable flow member in the second control channel portion.

16. The valve according to claim 11 wherein the valve element comprises a mouth on the end of the second control channel portion and a seat provided on a surface of the piston so that movement of the piston engages the mouth on the seat to effect opening and closing the second control channel portion.

17. The valve according to claim 16 wherein the mouth is flexible and the seat is formed by a rigid surface portion of the piston.

18. The valve according to claim 13 wherein the piston has a surface area of the piston face which is greater than a surface area of the valve head such that a force due to the pressure within the control chamber applied against the piston face overcomes a force due to the pressure in the inlet chamber applied against the valve head in order for the valve head to separate from the valve seat.

* * * * *